United States Patent [19]

Wakasa

[11] Patent Number: 4,903,137
[45] Date of Patent: Feb. 20, 1990

[54] PROJECTION TELEVISION RECEIVER COMPRISED OF MODULAR ARRAY OF INDIVIDUAL RGB PROJECTORS

[75] Inventor: Toshiya Wakasa, Tokyo, Japan
[73] Assignee: Pioneer Electronic Corporation, Tokyo, Japan
[21] Appl. No.: 280,919
[22] Filed: Dec. 6, 1988
[30] Foreign Application Priority Data
  Mar. 8, 1988 [JP] Japan .................... 63-52574
[51] Int. Cl.⁴ .................................. H04H 9/31
[52] U.S. Cl. .................... 358/254; 358/60; 358/237; 358/231; 353/94
[58] Field of Search .................... 353/94, 74, 119; 358/60, 231, 237, 248, 249, 254; 340/720
[56] References Cited

U.S. PATENT DOCUMENTS

| | | | |
|---|---|---|---|
| 3,909,525 | 9/1975 | Fagan | 358/87 X |
| 4,274,110 | 6/1981 | Lehnert | 358/60 |
| 4,368,485 | 1/1983 | Midland | 340/720 X |
| 4,635,105 | 6/1987 | Favreau | 340/720 X |
| 4,734,779 | 3/1988 | Levis et al. | 358/231 |

Primary Examiner—Howard W. Britton
Assistant Examiner—Mark R. Powell
Attorney, Agent, or Firm—Finnegan, Henderson, Farabow, Garrett and Dunner

[57] ABSTRACT

A multiple projection television receiver is made from of identical modules, each of the modules each of which have three cathode-ray tubes corresponding to the colors red, green and blue, respectively. The modules are stacked vertically and horizontally to form a single picture made from the modules. Each of the modules has a screen in the front behind which is located a Fresnel lens. The cathode-ray tubes project the picture through the Fresnel lens onto the screen. Couplers which are attached to the top of all the modules except the modules on the top row, which do not have couplers on top, are U-shaped support members which interlock with modules stacked on top. The height of the couplers may be larger towards the rear so that the assembled multiple projection television receiver is inclined forward. Engaging members extend out and interlock with adjacent modules to horizontally fix the television receiver modules.

9 Claims, 6 Drawing Sheets

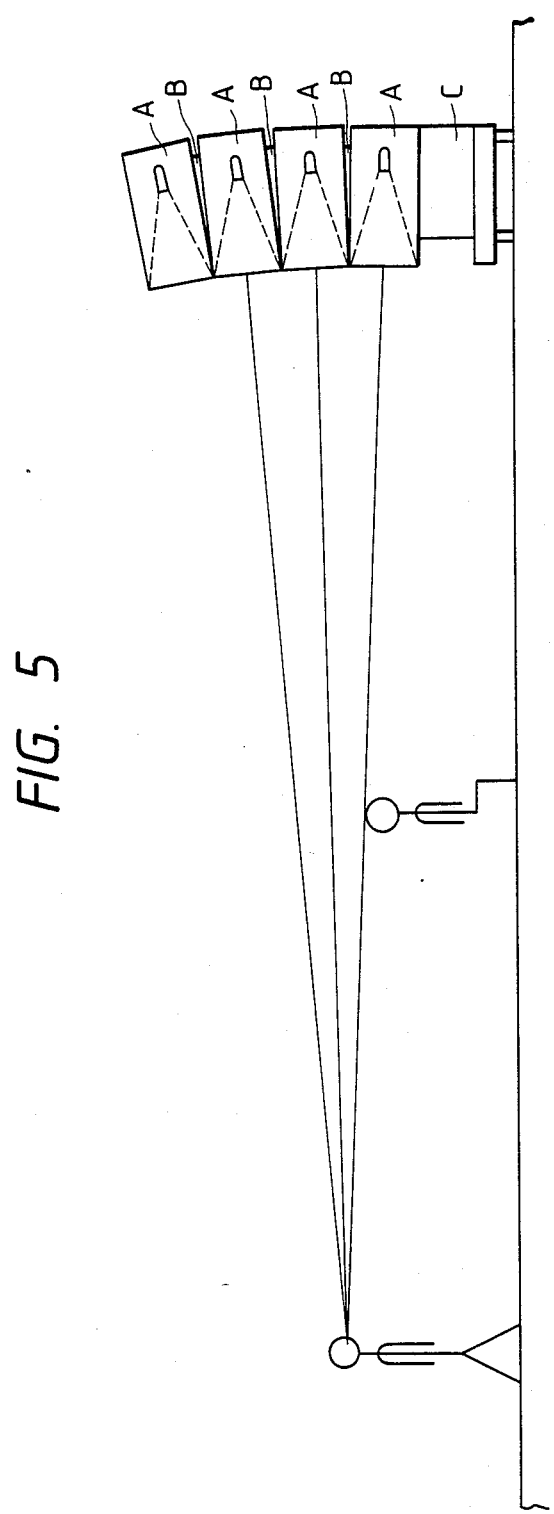

PROJECTION TELEVISION RECEIVER COMPRISED OF MODULAR ARRAY OF INDIVIDUAL RGB PROJECTORS

BACKGROUND OF THE INVENTION

The present invention relates to a multiple projection television receiver in which a plurality of projection television receiver modules are vertically and horizontally coupled to each other.

In a conventional multiple projection television receiver, screens are provided with separate Fresnel lenses which are disposed on the front of a box. Additionally, there are groups of cathode-ray tubes. The groups correspond in number to the screens and each group consists of three cathode-ray tubes which correspond to the colors red, green and blue. These groups of cathode-ray tubes are disposed at the rear of the box.

Since the plural groups of cathode-ray tubes and the screens equal in number to the groups of the tubes are provided in a single box in the conventional multiple projection television receiver, the tubes and the screens need to be detached from the box and the box must then be disassembled when the receiver is to be subjected to transportation or the like. After transportation or the like, the receiver must be assembled according to a reverse process of the disassembly thereof. This assembly and/or disassembly of a multiple projection television receiver is very troublesome.

The focusing directions of the Fresnel lenses provided behind the screens are varied in order to equalize the illuminations from each of the lenses for the center line among them. For example, if the number of the screens is four, the foci of the lenses are placed on the center line among the four screens. For these reasons, it is necessary to take the positions of the lenses into consideration in assembling the multiple projection television receiver. Therefore, it requires some skill to assemble the receiver. Moreover the lenses are not interchangeable, so they cannot be mass-produced and are, therefore, expensive.

The screens are made flat overall in order to be disposed in the box. For this reason, if the height of the multiple projection television receiver is large, the illumination at the top and bottom of the screen assembly is so low for some eye positions of the viewer of the receiver that he cannot see a sharp picture of uniform luminance.

SUMMARY OF THE INVENTION

Accordingly, it is an object of the present invention to provide a multiple projection television receiver which solves the above mentioned problems of the conventional multiple projection television receiver.

To achieve the objects and in accordance with the purpose of the invention, as embodied and broadly described herein, the multiple projection television receiver of this invention comprises a plurality of projection television receiver modules, each including a Fresnel lens; a screen located at the front of said receiver modules; three cathode-ray tubes corresponding to the colors red, green and blue, respectively, for projecting a picture from the tubes onto a screen through the Fresnel lens; and means for vertically and horizontally coupling each module to other modules wherein the front surface of said modules adjoining each other are adjacent and located in substantially the same plane.

In the multiple projection television receiver provided in accordance with the present invention, projection television receiver modules, each of which have the same constitution and include three cathode-ray tubes corresponding to the colors red, green and blue so that a picture is projected from the tubes onto a screen through a Fresnel lens, are vertically and horizontally coupled to each other so that the front surfaces of the modules adjoining each other are coincident with each other or located in the same plane. It is preferable that the modules in upper positions are inclined forward relative to the modules in lower positions.

The projection television receiver modules can be vertically coupled to each other by a coupling device in which couplers are secured to the tops of the lower modules so that the upper modules are placed on the couplers; and bolts engaged in tapped holes provided at the bottoms of the upper modules are inserted into the couplers so that the bolts can be tightened or loosened to move the upper modules back or forth relative to the lower modules, for adjustment. The height of each of the couplers may be greater at the rear end of the coupler than at the front end thereof to incline the upper modules forward relative to the lower modules.

The accompanying drawings which are incorporated in and constitute a part of this specification, illustrate one embodiment of the invention and, together with the description, serve to explain the principles of the invention.

BRIEF DESCRIPTION OF THE DRAWINGS

FIG. 5 shows a perspective view of the multiple projection television receiver in an assembled state according to the present preferred embodiment;

DESCRIPTION OF THE PREFERRED EMBODIMENT

Reference will now be made in detail to the present preferred embodiment of the invention, an example of which is illustrated in the accompanying drawings.

Figure 7:
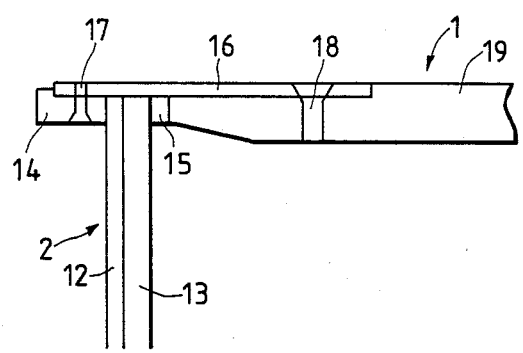
FIG. 7 shows a plan view of a section of the casing of the module according to the present preferred embodiment.

The preferred embodiment of a multiple projection television receiver comprises a plurality of projection television receiver modules A and a plurality of couplers B for coupling the modules to each other vertically as shown in FIG. 5. Each of modules A comprises a casing 1; three cathode ray tubes (not shown in the drawings) provided in the rear portion of the casing corresponding to the colors red, green and blue, respectively; a screen 2 (generally referred to as a lenticular lens) provided on the front of the casing; and a Fresnel lens 13 shown in FIG. 7 provided behind the screen. All the modules A have the same lenticular lenses 2 and the same Fresnel lenses 13.

Figure 3:
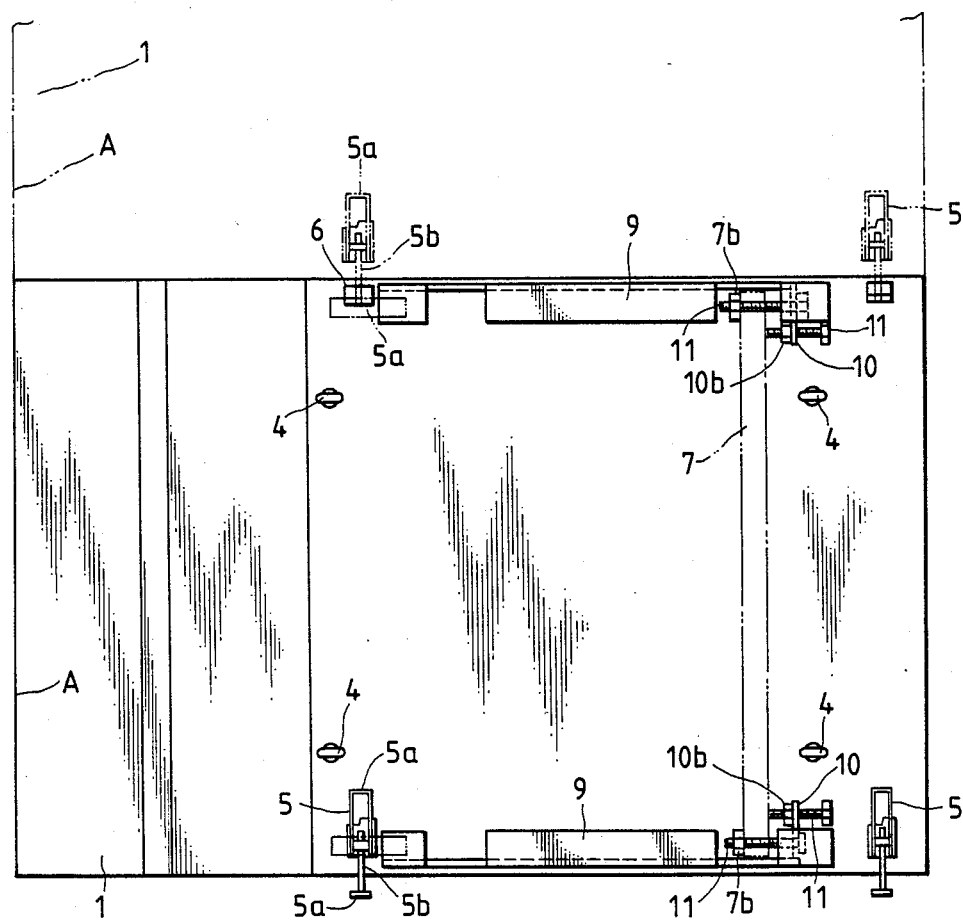
FIG. 3 shows a plan view of the module according to the present preferred embodiment.

Two handholds 3 for carrying the module A are provided on each of the right and left sides of the casing 1. Two hanger rings 4 for suspending the module A while positioning it are provided on casing 1 near each of the right and left side edges of the top thereof. Each of fasteners 5 has an engaging bar 5b which is moved back and forth by turning a handle 5a up and down. Two fasteners 5 are attached to the top of the casing 1 at one side edge of the top, as shown in FIG. 3. Two stoppers 6 are attached to the top of the casing 1 at the side edge opposite fasteners 5 on the top, as shown in FIG. 3.

When the modules A are juxtaposed together, the handles 5a of the fasteners 5 of one of the modules are turned up to move forth the engaging bars 5b thereof so that engaging discs 5c thereof engage stoppers 6 of the other adjacent module. When handles 5b of fasteners 5 of the modules A juxtaposed together are thereafter turned down, engaging bars 5b thereof are moved back so that the engagement of engaging disks 5c thereof and stoppers 6 is made firm and the modules are fastened to each other.

Feet 7' and 7 are secured to the corresponding front and rear portions, respectively, of the bottom of casing 1 of each module A so that the feet extend from one side to the other of the casing. Hooks 8 for tentative attachment are provided on the bottom of the casing 1 of each module A at both the side edges of the bottom slightly behind the front feet 7'. Each of the rear feet 7 has two screw insertion holes 7a at both the sides of the rear foot. A nut 7b is secured to one side of each rear foot 7 concentrically to the screw insertion hole 7a.

Some of couplers B are secured to the tops of the modules A except for the uppermost modules, and each include a pair of slender members 9 secured to the top of casing 1 of the corresponding module near the right and left side edges, respectively, of the top by screws or the like. The cross section of each slender member 9 is U-shaped. The height of each slender member 9 is gradually decreased from the rear end thereof toward the front end thereof. Three reinforcing members 10 are welded to each slender member 9. The rear reinforcing member 10 has two screw insertion holes 10a, which coincide with the screw insertion holes 7a of the corresponding rear foot 7. A nut 10b is secured to one side of the rear reinforcing member 10 concentrically to the screw insertion hole 10a corresponding to the screw insertion hole 7a at which the nut 7b is not secured. The upper portion of each slender member 9 has a notch 9a, in which the corresponding rear foot 7 is fitted.

Figure 1:
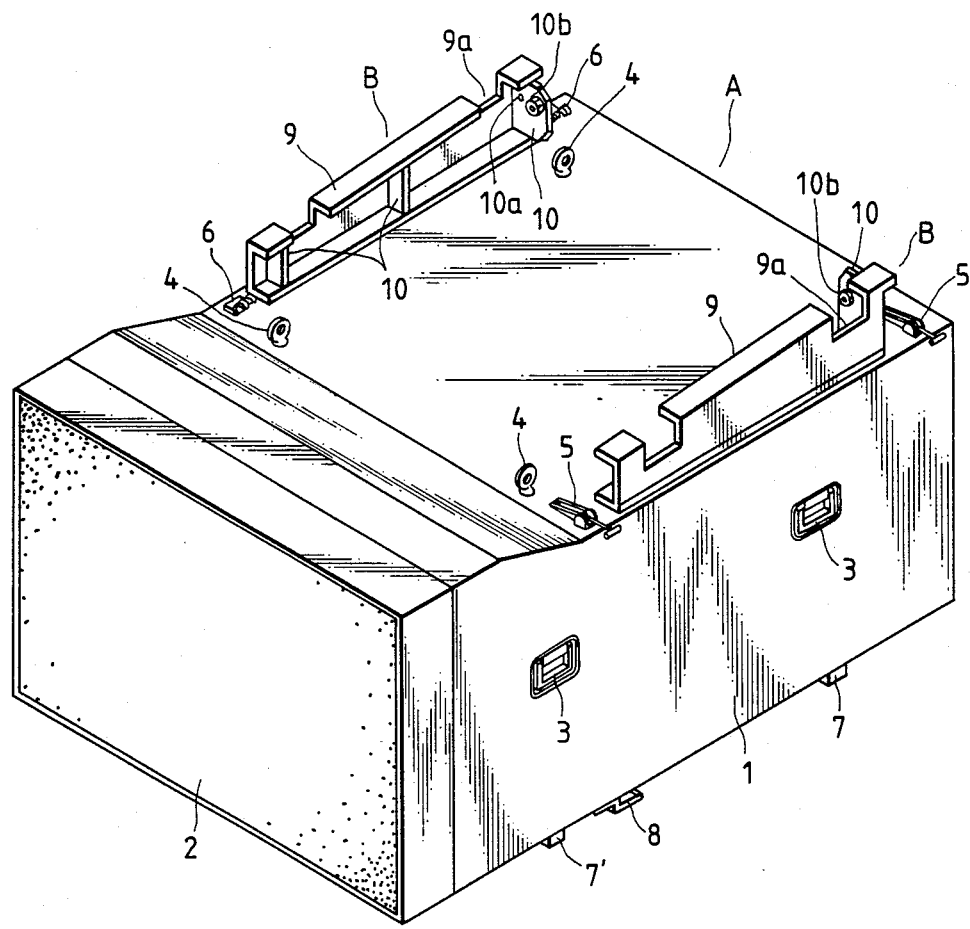
FIG. 1 shows a perspective view of each of the modules of a multiple projection television receiver according to a preferred embodiment of the present invention.
Figure 2:
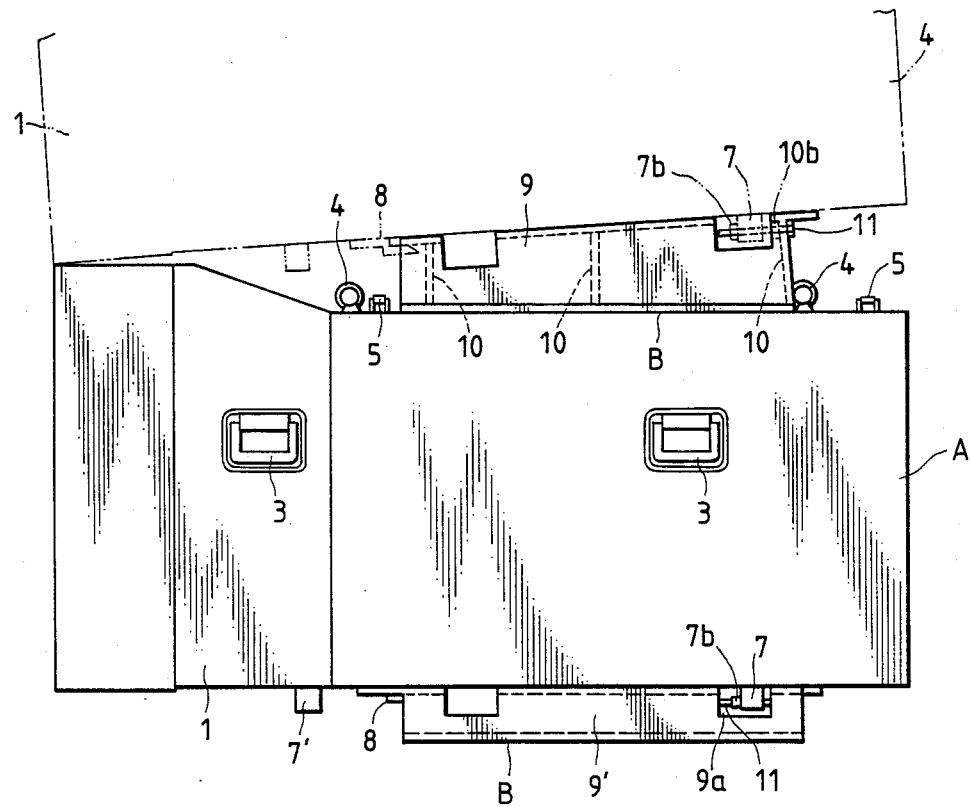
FIG. 2 shows a side view of the module according to the present preferred embodiment.

The other couplers B are secured to the bottom of the lowermost modules A, as shown in FIG. 2. The slender members 9' of these couplers B are the same as those 9 of the preceding couplers B except that the height of each of the slender members 9' is uniform from the rear end thereof to the front end thereof. The slender members 9' can be secured not only to the lowermost modules A, but also to the other modules A to couple them to each other in parallel with each other.

Figure 6:
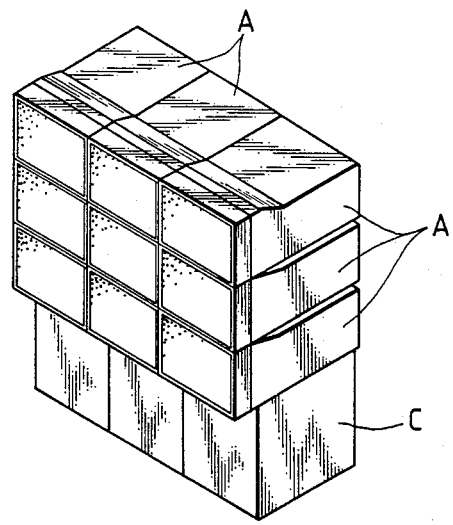
FIG. 6 shows a perspective view of the multiple projection television receiver in an alternative assembled state according to the present preferred embodiment.

A procedure of coupling all the projection television receiver modules A to each other by the couplers B to assemble the multiple projection television receiver will now be described. Slender members 9 of couplers B are secured to the tops of modules A by screws or the like except for the uppermost modules. The slender members 9' of the other couplers B are secured to the bottoms of the lowermost modules A to secure the modules to bases C by the slender members, as shown in FIGS. 5 and 6. A television reception means, a control circuit for sending out divided video signals to the cathode-ray tubes, loudspeakers and so forth are housed in the bases C.

The lowermost modules A juxtaposed together are coupled to each other by the fasteners 5 and the stoppers 6 attached to the tops of the casings 1 of the modules, so that no gap is made between the modules. The second lowermost modules A are then placed on the lowermost ones by hanging the second lowermost modules by hanger rings 4 with a hoist or the like. At that time, the hooks 8 provided on the bottom of the second lowermost modules A are engaged with the slender members 9 provided on the tops of the lowermost modules A, and the feet 7 provided on the second lowermost modules A, and the feet 7 provided on the second lowermost modules are fitted in the notches 9a of the slender members 9 provided on the lowermost modules.

Figure 4A:
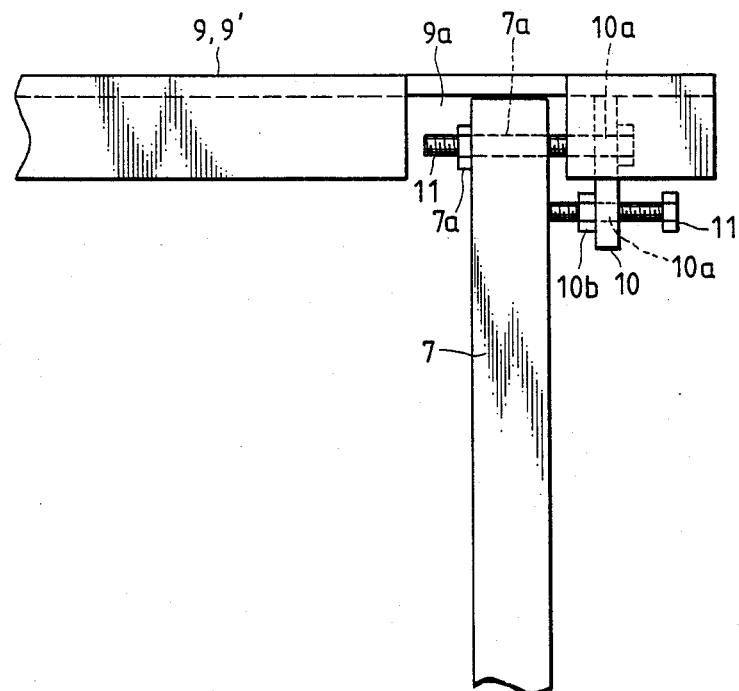
FIG. 4(a) shows a plan view of the horizontal adjusting portion of the module according to the present preferred embodiment.
Figure 4B:
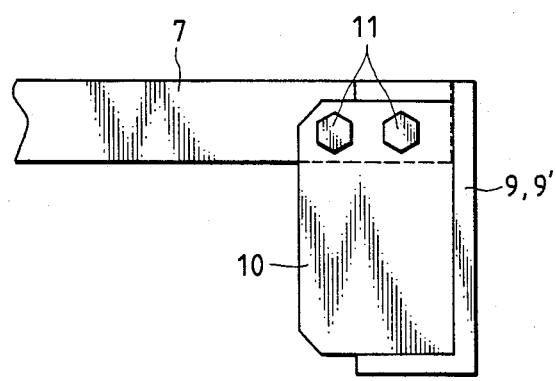
FIG. 4(b) shows a rear view of the horizontal adjusting portion according to the present preferred embodiment.

After that, bolts 11 are inserted into the two screw insertion holes 10a of each reinforcing member 10, one of the bolts is engaged in the nut 10b secured to the reinforcing member and put at the tip of the bolt in contact with the foot 7, and the other bolt is engaged in the nut 7b, as shown in FIG. 4. It is possible that one of the bolts 11 is tightened and the other is loosened to move the foot 7 back or forth to displace the casing of the second lowermost module A back or forth to make the front of the casing adjacent and substantially coplanar with that of the casing of the lowermost module A. The third lowermost modules A are thereafter likewise fastened to the tops of the second lowermost modules A. The modules A can thus be stacked at a desired number of levels.

If the module of the multiple projection television receiver provided in accordance with the present invention are vertically coupled to each other by the coupling device having the couplers, the height of each of which is greater at the rear end of the coupler than at the front end thereof, the upper modules A are inclined forward relative to the lower modules A as shown in FIG. 5. The resultant assembly is not completely planar but has a forward inclination so that a viewer even at a short distance from the multiple projection television receiver can see the pictures on the upper modules in sharp focus. The vertical and horizontal angles of the field of vision of the viewer to each module are normally ±10° and ±40°, respectively.

If a limited number of the modules A are coupled to each other as shown in FIG. 6 or the multiple projection television receiver is viewed from a relatively long distance, the upper modules do not need to be inclined forward relative to the lower modules and therefore all of the screens are located in the same plane. In that case, modules A are coupled to each other by the couplers B having slender members 9', the height of each of which is uniform from the rear end of the member to the front end thereof.

Figure 8:
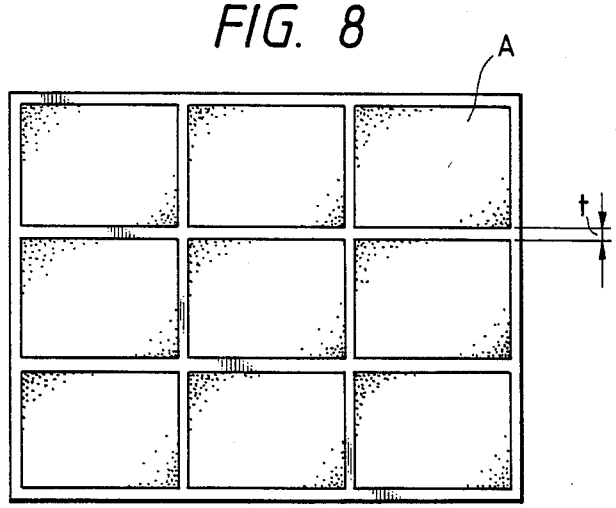
FIG. 8 shows a front view of the multiple projection television receiver according to the present preferred embodiment.

The thickness of the thin front frame 14 of the casing 1 of each module A, which is shown in FIG. 7, is set at 5.5 mm to minimized the width of the portion of the multiple projection television receiver which does not display any picture, shown in FIG. 8. For that purpose, an aluminum box 19 and a steel plate 16 of 1.6 mm in thickness are secured to each other by countersunk screws 18 to constitute casing 1. The screen 2 made of a lenticular sheet 12 and the Fresnel lens 13 are fitted on a rubber pad 15 and secured to the casing by frame 14 and countersunk screws 17, so that the screen can be detached from the front of casing 1, for replacement, when the screen is scratched or damaged. The portion of the multiple projection television receiver which does not display any picture is thus made nearly negligible. This overcomes the disadvantages of a picture on a multiple projection television receiver wherein ordinary projection television receivers are merely stacked together, and has a large area of at least 100 mm in width which does not display any picture.

According to the present invention, projection television receiver modules of the same construction can be easily vertically and horizontally coupled to each other by couplers to assemble a multiple projection television receiver, and can be easily uncoupled from each other to disassemble the receiver for transportation, storage or the like. Since any number of the modules to be coupled to each other can be chosen, the size of the receiver can be easily changed. The cost of the receiver is reduced since the modules are substantially identical. Since a module on the top of another module can be moved back and forth, i.e., horizontally, relative to the latter by manipulating the couplers, the width of the boundary line between the front surfaces of the screens of the modules adjoining each other can be minimized to make the portion of the receiver which does not display any picture nearly negligible. The screens of the receiver do not reflect things located around the receiver, and the picture thereon is flat. Couplers, the height of each of which is decreased from the rear end thereof toward the front end thereof can be used to couple the modules to each other to incline the upper modules forward relative to the lower modules to enable a viewer to see a sharp picture on the receiver regardless of the position of the viewer. Desirable effects are thus produced.

It will be apparent to those skilled in the art that various modifications and variations can be made in the multiple projection television receiver of the present invention without departing from the scope or spirit of the invention. Thus, it is intended that the present invention cover the modifications and variations of this invention provided they come within the scope of the appended claims and their equivalents.

What is claimed is:

1. A multiple projection television receiver comprising a plurality of projection television receiver modules, each including:
   a Fresnel lens;
   a screen located at the front of said receiver modules;
   three cathode-ray tubes corresponding to the colors red, green and blue, respectively, for projecting a picture from said tubes onto said screen through said Fresnel lens;
   means for vertically and horizontally coupling each module to other modules wherein the front surfaces of said modules adjoining each other are adjacent and located in substantially the same plane.

2. A multiple projection television receiver according to the claim 1, wherein said coupling means includes vertical coupling means for inclining forward the projection television receiver modules in upper positions relative to the projection television receiver modules in lower positions.

3. A multiple projection television receiver according to claim 1 wherein said coupling means includes couplers secured to the tops of said modules except for the uppermost module wherein the upper modules are placed on the couplers secured to the tops of the lower modules.

4. A multiple projection television receiver according to claim 3 wherein said coupling means includes bolts engaged in tapped holes provided at the bottoms of said upper modules, said bolts are inserted into said couplers and are operable to adjust the position of said upper modules back or forth relative to said lower modules.

5. A multiple projection television receiver according to claim 1 wherein each of said plurality of projection television receiver modules further includes the casing wherein said screen is removably attached to the front portion of said casing.

6. A multiple projection television receiver according to claim 5 wherein said case includes a steel box open at one end wherein said open end is surrounded by a thin steel band for minimizing the portion of the multiple projection television receiver which does not display any picture.

7. A multiple projection television receiver according to claim 6 wherein the box forms a shoulder inside of said steel plate and wherein said screen and said Fresnel lenses are secured against said shoulder.

8. A coupling device for a multiple projection television receiver, having a plurality of projection television receiver modules each of which include three cathode-ray tubes corresponding to the colors red, green and blue, respectively, wherein a picture is projected from said tubes onto a screen through a Fresnel lens and said projection television receiver modules are vertically coupled to each other, comprising:
   couplers secured to the tops of said modules except for the uppermost module wherein the upper modules are placed on the couplers secured to the tops of the lower modules; and
   bolts engaged in tapped holes provided at the bottoms of said upper modules, said bolts are inserted into said couplers and are operable to adjust the position of said upper modules back or forth relative to said lower modules.

9. A coupling device according to the claim 8, wherein the height of each of the couplers is greater at the rear end of the coupler than the front end thereof to incline the upper modules forward relative to the lower modules.

* * * * *